Dec. 25, 1962

D. R. JAMES 3,070,140

CITRUS PEEL SHAVER

Filed March 1, 1960

INVENTOR.
DONALD R. JAMES
BY
*Lyon+Lyon*
ATTORNEYS.

Dec. 25, 1962

D. R. JAMES 3,070,140

CITRUS PEEL SHAVER

Filed March 1, 1960

*INVENTOR.*
DONALD R. JAMES

BY *Lyon & Lyon*

ATTORNEYS.

3,070,140
CITRUS PEEL SHAVER
Donald R. James, Covina, Calif., assignor to Citrus Equipment Corporation, Whittier, Calif., a corporation of California
Filed Mar. 1, 1960, Ser. No. 12,121
16 Claims. (Cl. 146—3)

This invention relates to the processing of citrus fruit and has particular reference to an apparatus for shaving or slicing the peel of citrus fruit.

One of the principal objects of the present invention is to provide a novel apparatus for shaving the skin or peel of citrus fruit to separate the flavedo and albedo layers thereof, or to separate the rag from the remainder of the skin, leaving the flavedo and albedo layers intact.

Citrus peel oil is an extremely valuable commodity and many attempts have heretofore been made to produce a machine capable of automatically extracting the peel oil from the fruit. While certain of these attempts have been commercially successful from the standpoint of recovery of a satisfactory product, they are all subject to one or more drawbacks such as low yields, high cost, relatively low speeds of operation or the requirement for careful orientation of the peel prior to introduction to the peel oil isolation apparatus. An important object of this invention is, therefore, to provide a novel apparatus for the removal of the oil-bearing flavedo layer from the skin of citrus fruits, which layer in turn can be easily operated upon to separate the oil therefrom, the apparatus not being subject to the disadvantages of those heretofore proposed or used.

Another object of this invention is to provide a novel apparatus for shaving citrus peels to produce isolated layers thereof at high speeds and with a minimum of loss of the valuable oils contained therein, the apparatus being designed to operate upon juice-depleted citrus peel halves or other segments without orientation thereof.

Another object of the present invention is to provide a citrus peel shaver of small size yet having an extremely high capacity.

Other objects and advantages of this invention it is believed will be readily apparent from the following detailed description of a preferred embodiment thereof when read in connection with the accompanying drawings.

FIGURE 7 is a perspective view illustrating a typical flavedo layer as separated by the apparatus.

FIGURE 8 is a perspective view illustrating a typical albedo layer as separated by the apparatus.

FIGURE 9 is a fragmentary vertical sectional view, on an enlarged scale, of one of the peel contacting and gripping drums.

Figure 1:
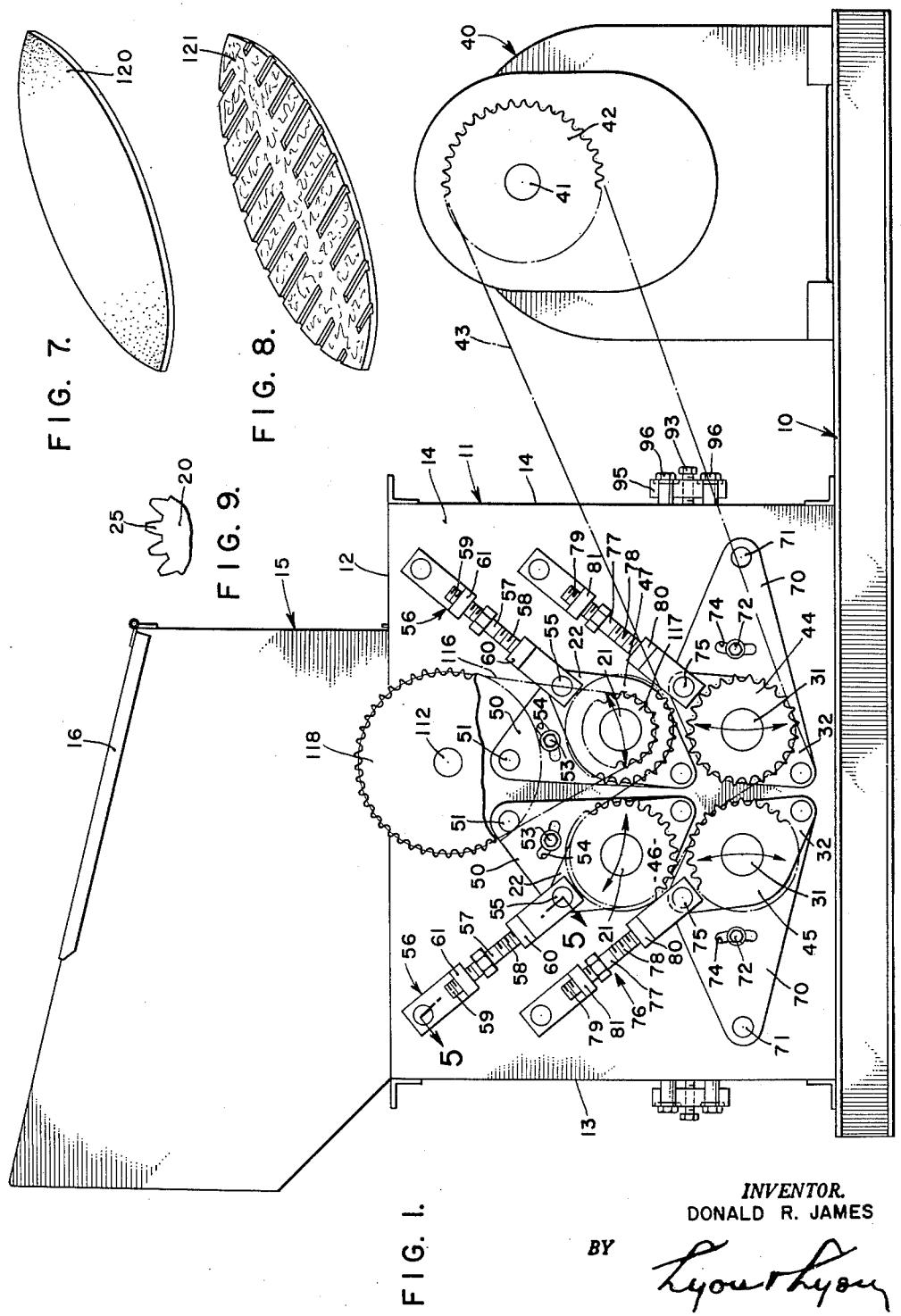
FIGURE 1 is a side elevation of the apparatus of the present invention.

Referring now to the drawings, the apparatus of the present invention includes a framework 10 to which is secured a generally rectangular housing 11 having a top wall 12, front and back walls 13 and 14 and side walls 14'. A hopper 15 is secured to the housing and extends down through the top wall 12, the hopper being provided with a pivoted top closure 16 and a pivoted chute wall 17 for cleaning purposes.

Mounted directly below the bottom opening in the hopper is a pair of rollers or drums 20, each drum being mounted on a horizontal shaft 21 extending lengthwise of the frame and journalled at each end in bearing members 22. The drums 20 are mutually parallel and spaced apart to form a narrow bite 23, the normal spacing between the outermost peripheral surfaces of the drums being about 50% of the thickness of the peel to be operated upon. The cylindrical surfaces of the drums are provided with a plurality of circumferentially spaced, parallel ribs 25, preferably parallel to the axis of its respective drum as shown. A number of sets of these longitudinally extending ribs are provided, adjacent sets being spaced apart to provide a plurality of circumferential grooves 26.

A second pair of rollers 30, preferably having smooth cylindrical surfaces is mounted directly below the rollers 20, each roller 30 being carried on a shaft 31 suitably journalled in a bearing member 32. The rollers 30 are each closely spaced from the adjacent roller 20, the spacing being approximately the same as that between the rollers 20. As is apparent from the drawings and the following description, the rollers 30 provide means, cooperating with the rollers 20 for guiding the peel gripped by the rollers 20 as the peel is diverted in one direction or the other, and for properly positioning the peel for presentation to the knife.

Figure 2:
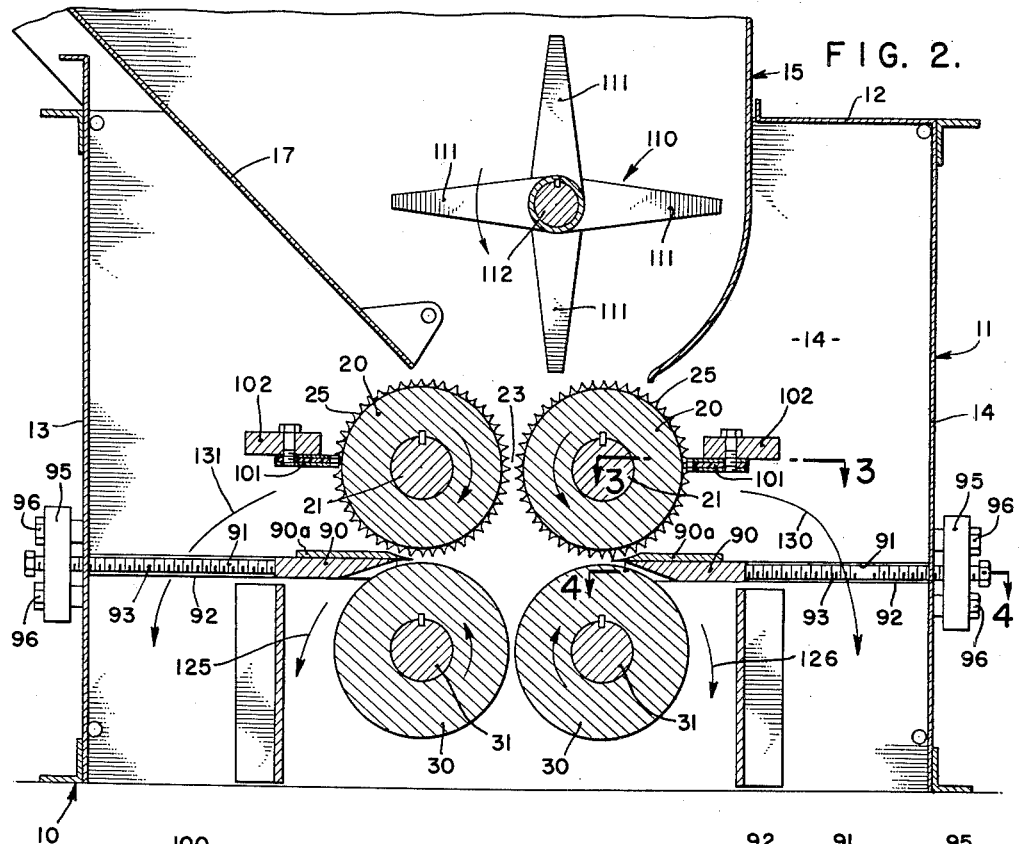
FIGURE 2 is a vertical sectional elevation thereof.

Drive means are provided for the two pairs of rollers and as shown in the drawings these means may include a motor 40, the drive shaft 41 of which carries a sprocket 42 for engagement with a transmission chain 43 extending to a sprocket 44 on one of the shafts 31, thence to a sprocket 45 on the other shaft 31, thence around a sprocket 46 on one of the shafts 21, thence to a sprocket 47 on the other shaft 21 and back to the sprocket 42. Thus the rollers 20 and 30 are caused to rotate in the directions of the arrows of FIGURE 2.

Means are provided for adjusting the spacing between the rollers 20 and between each roller of each pair of rollers 20 and 30. As shown in the drawings, the bearing members 22, which support the rollers 20, are rigidly secured to bearing support plates 50, each plate being pivotally connected to the frame by means of a pin 51 and adjustably locked in the desired position by means of a nut and bolt assembly 53 extending through an arcuate groove 54 in each plate. Pivoted to each plate and bearing member assembly by means of a pin 55 is a turnbuckle assembly 56. The assembly comprises a turnbuckle 57 having fine threads 58 and coarse threads 59, the threads 58 being engaged in a threaded opening in a bracket 60 and the coarse threads 59 being engaged in a threaded opening in a bracket 61 pivoted to the frame. It will thus be understood that the rollers 20 are adjustable in general directions toward and away from each other (as indicated by the arrows in FIGURE 1) merely by turning the turnbuckle 57 one way or the other, of course after first loosening the nut and bolt assemblies 53.

The means for adjustment of the rollers 30 are essentially the same except that here the directions of adjustment are toward and away from the adjacent roller 20, in the directions of the arrows of FIGURE 1. Thus, each bearing member 32 is rigidly secured to a bearing support plate 70, each plate being pivotally connected to the frame by means of a pin 71 and adjustably locked in the desired position by means of a nut and bolt assembly 72 extending through an arcuate groove 74 in each plate. Pivoted to each plate and bearing member assembly by means of a pin 75 is a turnbuckle assembly 76, the assemblies comprising a turnbuckle 77 having fine threads 78 and coarse threads 79, the threads 78 being engaged in a threaded opening in a bracket 80 and the coarse threads 79 being engaged in a threaded opening in a bracket 81 pivoted to the frame.

Figures 3, 4:
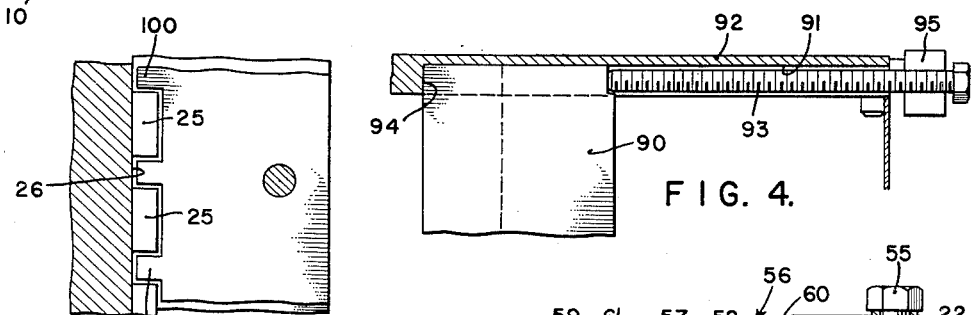
FIGURE 3 is a sectional elevation taken substantially on the line 3—3 of FIGURE 2.
FIGURE 4 is a sectional elevation taken substantially on the line 4—4 of FIGURE 2.
Figure 5:
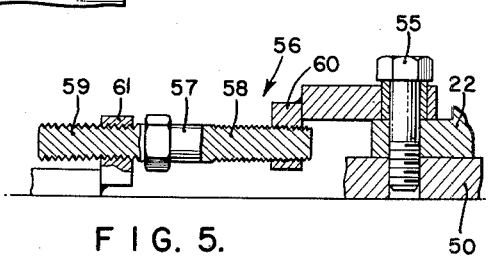
FIGURE 5 is a sectional elevation taken substantially on the line 5—5 of FIGURE 1.
Figure 6:
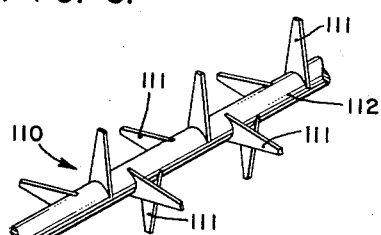
FIGURE 6 is a fragmentary perspective view of the agitator or kick-off mechanism.

Knife means are provided for shaving the citrus peel and, as shown in the drawings, these means may include the pair of horizontal knife blades 90a, mounted on knife holders 90, one mounted on either side of the pairs of rollers, the cutting edge of each blade extending into the discharge portion of the bite between the adjacent rollers 20 and 30 and nearly to the center line of the rollers. The knife holders are each fixedly mounted in grooves 91 in a pair of frame members 92 by means of a pair of screw elements 93 which bear against the back edges of each of the knife holders, forcing the respective knife holder up against the end 94 of each groove 91, as shown in FIGURE 4. The screw elements 93 are each threadedly engaged in a support block 95 secured to the frame by means of quick release bolts 96 for ready removal of the knife holders and blades for cleaning purposes.

Means are provided for stripping the albedo from the rollers 20 and, as shown in the drawings, these means may include a plurality of finger members 100, each of which extends into one of the circumferential grooves 26. The fingers are a part of a pair of comb-like members 101, one mounted on a frame member 102 on either side of the pair of rollers 20.

Means are provided in the hopper 15 for clearing peel jams adjacent the inlet portion of the bite between the rollers 20. As shown in the drawings these means may include an agitator or kick-off mechanism 110, comprising a plurality of paddle-like members 111 extending radially outwardly from a shaft 112. The shaft 112 is preferably mounted on suitable bearings (not shown) to one side of a vertical plane bisecting the bite between the rollers 20, the outermost tips of the paddles 111 extending into close proximity to one of the rollers 20 and to the arcuate side wall 115 of the hopper. The mechanism 110 is rotated at a speed somewhat less than that of the rollers 20 in the direction of the arrow of FIGURE 2 by means of a chain 116 extending from a sprocket 117 on one of the shafts 21 to a sprocket 118 on the shaft 112.

In use of the apparatus of this invention, the citrus fruit, such as lemons, oranges or grapefruit, is cut into halves and the juice and pulp extracted therefrom in any convenient manner, such as in a citrus juice extracting machine. Suitable machines are disclosed in Patent No. 2,767,644, issued to F. W. Bireley, Patent No. 2,199,876, issued to William D. Brown, and Patent No. 2,212,066, issued to Lawrence A. Fry. The peel halves from the Brown machine are preferably flattened or partially flattened, or the halves are quartered or cut into other segments before feeding into the hopper 15. Peel halves from machines of the Bireley and Fry types are fed directly into the hopper since they are in a flattened condition.

The peel halves or the segments slide down the chute 17 and are drawn into the bite 23, the albedo portions thereof being impaled by the ribs 25 of the particular roller 20 faced by the albedo. The roller thus grips the peel and conveys it to the knife blade 90a which cleanly separates the peel along a plane parallel to the upper and lower surfaces thereof. Depending upon the adjustment of the rollers 20 and 30, the peel is separated into the flavedo layer 120 and albedo layer 121, as indicated in FIGURE 8, or the flavedo and albedo layers are left intact, being separated as such from the rag portion of the peel. In the first case, the flavedo falls in the direction of the arrow 125 or 126 of FIGURE 2 (depending upon which roller 20 the particular peel was impaled), and the albedo is stripped from its roller 20 by the fingers 100 and falls in the direction of the arrows 130 or 131. The flavedo layers thus separated, which contain the valuable peel oil, are then subjected to any suitable pressing or other operation to extract the oil therefrom. In the second case, the rag-free peel is ready for delivery to the processors of glacé fruit.

It will be understood that no orientation of the peel is necessary with the apparatus of this invention. That is, the peels are fed to the hopper in random distribution, the rollers 20 selectively gripping peel portions depending upon the disposition of the portions as they enter the bite 23. This is made possible by the fact that the ribs 25 dig or bite into only the relatively soft albedo and not the relatively tough flavedo. Therefore, due to the random disposition of the peel, over a long running period, roughly one-half of the total amount of peel segments will be processed on each of the two rollers 20. It has been found in actual practice that the apparatus is highly selective, 95% or more of the peel segments being properly fed to the knife blades 90a.

The mechanism 110 automatically cleans the hopper of any accidental pile-up of peel. Occasionally a peel segment will bridge the bite 23, concave side down, blocking further feeding of segments into that portion of the bite. In such event, the paddle members 111 immediately kick-off or remove the interfering segment or segments, conveying them around the interior of the hopper to be re-fed to the bite 23.

The apparatus of the present invention, although of extremely compact dimensions, is capable of very high production rates. For example, a machine only 15 inches wide (approximate roller length) has a capacity of 5–10 tons or more of peel per hour.

The apparatus of the present invention is capable of being used as a citrus fruit juice extractor. In such case citrus fruit halves, quarters or other segments are fed into the hopper 15. The positions of the knife blades 90a relative to the rollers 20 and 30 are adjusted so that substantially all of the peel is cut or sliced away from the meat of the fruit. The operation of the apparatus for this purpose is substantially the same as described above. That is, the fruit segments as they are fed into the bite 23 are selectively adhered to or impaled on the particular roller 20 which is faced by the meat of the individual fruit segment. A portion of the juice is squeezed out in the passage through the bite 23. The remainder of the juice and pulp, preferably together with a small portion of the rag, is separated from the peel by the knife blades 90a, the peel (in this case both flavedo and albedo) and some juice being sent to the flavedo discharge and the remaining juice and pulp leaving via the albedo discharge. If desired the peel may then be processed in another unit embodying the apparatus of this invention, for separation of the albedo and flavedo.

Having fully described my invention it is to be understood that I do not wish to be limited to the details set forth above, but my invention is of the full scope of the appended claims.

I claim:

1. An apparatus for shaving citrus peel comprising a pair of closely spaced, parallel rollers, means on each of said rollers for selectively adhering citrus peel thereto with the albedo portion of the peel facing the selecting roller, a second pair of rollers, one roller of said second pair being parallel to and closely spaced from one roller of said first-mentioned pair of rollers, and a pair of knife blades, both said knife blades being remote from the bite between said first pair of rollers, one of said knife blades operably associated with each of said rollers for shaving citrus peel adhered to said rollers, each of said knife blades extending into the discharge side of the bite between the rollers of the first and second pairs of rollers.

2. An apparatus for shaving citrus peel comprising a pair of closely spaced, parallel rollers, means on each of said rollers for selectively adhering citrus peel thereto with the albedo portion of the peel facing the selecting roller, said means comprising a plurality of ribs on the surfaces of said rollers, a second pair of rollers, one roller of said second pair being parallel to and closely spaced from one roller of said first-mentioned pair of rollers, and a pair of knife blades, both said knife blades being remote from the bite between said first pair of rollers, one of said knife blades operably associated with each of said rollers for shaving citrus peel adhered to said rollers, each of said knife blades extending into the discharge side of the bite between the rollers of the first and second pairs of rollers.

3. An apparatus for shaving citrus peel comprising a pair of closely spaced, parallel rollers, means on each of said rollers for selectively adhering citrus peel thereto with the albedo portion of the peel facing the selecting roller, said means comprising a plurality of ribs on the surfaces of said rollers, means for feeding citrus peel to the bite between said rollers, means for clearing said bite of peel not entering said bite, a second pair of rollers, one roller of said second pair being parallel to and closely spaced from one roller of said first-mentioned pair of rollers, and a pair of knife blades, both said knife blades being remote from the bite between said first pair of rollers, one of said knife blades operably associated with each of said rollers for shaving citrus peel adhered to said rollers, each of said knife blades extending into the discharge side of the bite between the rollers of the first and second pairs of rollers.

4. The apparatus of claim 3 wherein said rollers of said first-mentioned pair of rollers are provided with a plurality of circumferential grooves, and fingers extending into said grooves to remove albedo portions adhered to said rollers.

5. The apparatus of claim 4 wherein said rollers are generally horizontal, the feed means includes a hopper positioned above the bite between said rollers and the clearing means comprises a plurality of rotary paddles adapted to pass in close proximity to said bite.

6. The apparatus of claim 1 wherein means are provided for adjusting the spacing between the first pair of rollers and wherein means are provided for individually adjusting the spacing between each roller of said second pair of rollers and the adjacent roller of said first pair of rollers.

7. The apparatus of claim 4 wherein means are provided for adjusting the spacing between the first pair of rollers and wherein means are provided for individually adjusting the spacing between each roller of said second pair of rollers and the adjacent roller of said first pair of rollers.

8. Apparatus for shaving citrus peel comprising a pair of substantially parallel feeding rolls having ribs on their surfaces, said rolls being spaced apart substantially the thickness of the peel being shaved, a second pair of feeding rolls located below said first pair of rolls, said second pair of rolls being spaced from each other and from the respective rolls of said first pair of rolls substantially uniform distances, said distances being substantially the same as that between said first pair of rolls, and a shaving knife on the outside of and adjacent the bite of each pair of top and bottom rolls.

9. Apparatus for shaving citrus peel comprising an upper pair of substantially parallel feeding rolls having ribs on their surfaces, said rolls being spaced apart less than the thickness of the peel being shaved, a lower pair of feeding rolls located below said upper pair of rolls, each one of said lower rolls forming a bite with a corresponding one of said upper pair of rolls, the rolls of said lower pair being spaced from each other, each of said lower rolls being spaced from said corresponding roll of said upper pair of rolls substantially uniform distances, said distances being substantially the same as that between the rolls of said upper pair of rolls, and a shaving knife on the outside of and adjacent the bite between each pair of upper and lower rolls.

10. Apparatus for feeding and shaving citrus peel comprising a pair of substantially parallel rolls, said rolls having longitudinally extending ribs on their surfaces, and rolls being spaced apart a distance such that the distance between the outer ends of opposed ribs is equal to at least substantially half of the thickness of the peel being fed between said rolls, whereby citrus peel fed in random orientation between said rolls is selectively gripped by the ribs of one of said rolls with the albedo portion of the peel facing said roll, the peel being diverted in one direction or the other, depending upon the disposition of the albedo and flavedo portions of said peel relative to said rolls as the peel passes therebetween.

11. The apparatus of claim 10, including drive means for rotating said rolls in opposite directions, and means for removing the peel from the roller ribs upon which the peel is gripped.

12. The apparatus of claim 10, including means cooperating with each of said ribbed rolls for guiding the diverted peel in said directions.

13. The apparatus of claim 12, wherein said means comprises a pair of feeding rolls located below said ribbed rolls, each one of said lower rolls forming a bite with a corresponding one of said rolls, the rolls of said lower pair being spaced from each other, each of said lower rolls being spaced from said corresponding roll of said pair of ribbed rolls substantially uniform distances, said distances being substantially the same as that between the rolls of said pair of ribbed rolls, and including drive means for rotating said ribbed rolls in opposite directions with the opposed adjacent surfaces thereof moving downwardly, and means for rotating said lower rolls in opposite directions with the opposed adjacent surfaces thereof moving upwardly.

14. The apparatus of claim 12, including a shaving knife mounted in a position, with respect to one of said ribbed rolls and said means, to shave peel diverted thereto by said one ribbed roll.

15. The apparatus of claim 13, including a shaving knife on the outside of and adjacent the bite between each pair of ribbed rolls and lower rolls.

16. The apparatus of claim 15, including means for removing shaved peel from the ribbed rolls.

References Cited in the file of this patent

UNITED STATES PATENTS

| | | |
|---|---|---|
| 2,208,787 | Brown | July 23, 1940 |
| 2,212,066 | Fry | Aug. 20, 1940 |
| 2,477,289 | De Moss | July 26, 1949 |

FOREIGN PATENTS

| | | |
|---|---|---|
| 318,043 | Great Britain | Aug. 29, 1929 |